United States Patent
Watanabe et al.

(10) Patent No.: US 6,775,805 B1
(45) Date of Patent: Aug. 10, 2004

(54) METHOD, APPARATUS AND PROGRAM PRODUCT FOR SPECIFYING AN AREA OF A WEB PAGE FOR AUDIBLE READING

(75) Inventors: Takeshi Watanabe, Yokohama (JP); Yoshimitsu Tanji, Atsugi (JP)

(73) Assignee: International Business Machines Corporation, Armonk, NY (US)

( * ) Notice: Subject to any disclaimer, the term of this patent is extended or adjusted under 35 U.S.C. 154(b) by 756 days.

(21) Appl. No.: 09/677,928

(22) Filed: Oct. 3, 2000

(30) Foreign Application Priority Data

Oct. 6, 1999 (JP) .......................................... 11-285188

(51) Int. Cl.[7] .............................................. G06F 17/00
(52) U.S. Cl. ...................................................... 715/513
(58) Field of Search ................................. 715/513, 532, 715/530, 531, 536; 704/275, 270.1, 7, 258; 709/206, 218, 238

(56) References Cited

U.S. PATENT DOCUMENTS

| | | | | |
|---|---|---|---|---|
| 5,893,132 A | * | 4/1999 | Huffman et al. ............ | 715/532 |
| 6,108,629 A | * | 8/2000 | Kasday ........................ | 704/258 |
| 6,240,448 B1 | * | 5/2001 | Imielinski et al. .......... | 709/218 |
| 6,363,337 B1 | * | 3/2002 | Amith ............................ | 704/7 |
| 6,405,224 B1 | * | 6/2002 | Van Der Meer ............ | 715/513 |
| 6,449,636 B1 | * | 9/2002 | Kredo et al. ................. | 709/206 |
| 6,604,075 B1 | * | 8/2003 | Brown et al. ............. | 704/270.1 |
| 6,636,896 B1 | * | 10/2003 | Philyaw ..................... | 709/238 |
| 6,643,621 B1 | * | 11/2003 | Dodrill et al. .............. | 704/275 |

* cited by examiner

Primary Examiner—Sanjiv Shah
(74) Attorney, Agent, or Firm—John E. Campbell; Floyd A. Gonzalez

(57) ABSTRACT

It is one object of the present invention to provide a method and an apparatus whereby a Web page creator can easily specify, in a Web page, a desired text area for audible reading, merely by using an input device, such as a keyboard or a mouse. A Web page creator need only use an input device to mark and specify a desired text portion that is to be read audibly, so that tag information and a program, which are required when a browser reads a specific portion of text on a Web page, are automatically inserted into a Web page that is being created. Further, a tag for visually displaying an area to be read audibly is automatically inserted, so that a creator and a reader of a Web page can easily identify a portion that is to be read audibly.

23 Claims, 12 Drawing Sheets

```
<!DOCTYPE HTML PUBLIC "-//W3C//DTD HTML 4.0 TRANSITIONAL//EN">
<HTML>
<HEAD>
<TITLE> VOICE SAMPLE</TITLE>           READING TEXT
                                    61 DETECTION PROGRAM
<SCRIPT LANGUAGE="JavaScript">
<!--
function window_Onload()
~~
    for (i=0; i<document.all.length;i++){
    if (document.all(i).tagName=="SPAN" || (document.all(i).tagName=="DIV")
        if (document.all(i).className=="hpb_speak")
~~
            if (document.all(i).innerText != 0)
                hpb_speak.Speak(document.all(i).innerText);
~~

~~
-->
</SCRIPT>
</HEAD>
<BODY onload=window_Onload0>
```

FIG.6A

```
<OBJECT id="hpb_speak" type="application/x-oleobject"
 classid="clsid;44CF3B0C-9F1F-11D2-B9D7-06005A4B5E6E" width="160" height="30">
    <PARAM name="_Version" value="65536">
    <PARAM name="_ExtentX" value="4233">
    <PARAM name="_ExtentY" value="794">
    <PARAM name="_StockProps" value="0">
    <PARAM name="UseButton" value="-1">
    <PARAM name="UseWebSpeak" value="-1">
    <PARAM name="ModeGuide" value="{904AAB61-5D94-11D0.83DA-44553540000}">
    <PARAM name="Pitch" value="80">
    <PARAM name="Speed" value="180">
    <PARAM name="Volume" value="32767">
</OBJECT>
```

TEXT READING ENGINE SETUP INFORMATION 62

```
<H1>Today's new product news I</H1>
<DIV CLASS="hpb_speak">
<H2> Release of new notebook computer decided </H2>
<P> Two following functions </P>
<UL>
<LI> Internet connection function
<LI> Audible reading function
</UL>
</DIV>
```

63 PORTION SPECIFIED FOR AUDIBLE READING

```
<P> Plan to release new notebook computer <SPAN CLASS="hpb_speak"> in January 2000 </SPAN>
</P>
</BODY>
```

FIG.6B

| FIG.9A | FIG.9B |

FIG.9

```
<!DOCTYPE HTML PUBLIC "-//W3C//DTD HTML 4.0 TRANSITIONAL//EN">
<HTML>
<HEAD>
<TITLE> VOICE SAMPLE</TITLE>
<SCRIPT LANGUAGE="JavaScript">
<!--
function window_Onload()
{
    for (i=0; i<document.all.length;i++){
        if (document.all(i).tagName=="SPAN" || (document.all(i).tagName=="DIV")
        {
            if (document.all(i).className=="hpb_speak")
            {
                if (document.all(i).innerText != 0)
                    hpb_speak.Speak(document.all(i).innerText);
            }
        }
    }
}
~~
-->
</SCRIPT>
<!--
.hpb_speak{
    background-color:yellow;
    color: red;
~~
-->
```

TEXT READING AREA VISUAL DISPLAY INFORMATION TAG
31

FIG.9A

```
</STYLE>
</HEAD>
<BODY onload=window Onload0>
<OBJECT id="hpb_speak" type="application/x-oleobject"
classid="clsid;44CF3B0C-9F1F-11D2-B9D7-06005A4B5E6E" width="160" height="30">
    <PARAM name="_Version" value="65536">
    <PARAM name="_ExtentX" value="4233">
    <PARAM name="_ExtentY" value="794">
    <PARAM name="_StockProps" value="0">
    <PARAM name="UseButton" value="-1">
    <PARAM name="UseWebSpeak" value="-1">
    <PARAM name="ModeGuide" value="{904AAB61-5D94-11D0-83DA-44553540000}">
    <PARAM name="Pitch" value="80">
    <PARAM name="Speed" value="180">
    <PARAM name="Volume" value="32767">
</OBJECT>
<H1>Today's new product news !</H1>
<DIV CLASS="hpb_speak">
<H2> Release of new notebook computer decided </H2>
<P> Two following functions </P>
<UL>
<LI> Internet connection function
<LI> Audible reading function
</UL>
</DIV>
<P> Plan to release new notebook computer<SPAN CLASS="hpb_speak">in January 2000 </SPAN>
</P>
</BODY>
```

FIG.9B

METHOD, APPARATUS AND PROGRAM PRODUCT FOR SPECIFYING AN AREA OF A WEB PAGE FOR AUDIBLE READING

FIELD OF THE INVENTION

The present invention relates to a method and an apparatus that enables the use of a widely employed authoring tool for creating Web pages on the Internet to easily specify a user desired area within the web page for audible reading. "Audible reading" is the computer based process of translating text data into mechanically created sound (preferably emulating a human voice) over an acoustical speaker.

BACKGROUND OF THE INVENTION

Because HTML (Hypertext Markup Language) is used to create an Internet "World Wide Web" (Web) page, conventionally, a user having no knowledge of the language could not create his or her own Web page. Recently, however, an authoring tool has appeared that makes it unnecessary for a user to know HTML in order to create a Web page. With the authoring tool, a user is able to create a Web page as though he or she were simply laying out a document using a common word processor.

However, a knowledge of HTML is still required when creating a high-level, sophisticated Web page. A Web page, for instance, providing audible reading of only a portion of the Web page (specified by a web page creator) when the Web page is loaded and displayed by a browser.

An explanation will now be given for a conventional method used to specify an area of a Web page that can be used for audible reading. Conventionally a tag is inserted into a Web page HTML that calls a text reading engine when a text area for audible reading is specified in a Web page that is displayed by a browser. An example of this is shown in FIG. 1 which shows a diagram depicting a sample Web page HTML that is prepared for display by a text editor. The source file for the Web page is designated by the HTML tags that are used. In this example, a program for audible reading designated by the <OBJECT> tag provides a function for reading the text in the Web page when displayed by a browser. With this method, however, all portions of the Web page that are displayed are read; it is impossible to designate for audible reading only a desired portion of the Web page.

Even if a method for designating a desired area in a Web page for reading and means for transmitting the designated area to a program for audible reading are provided, when the complicated tag coding that is required is taken into account, the operating efficiency will be low if the common text editor employed for FIG. 1 is used to design and edit a desired audible reading area.

Therefore, to create a high-level Web page on which only an area that was designated by a Web page creator is read audibly, an authoring tool, for defining the structure of a document, is also required that, like a word processor, provides a WYSIWYG (What You See Is What You Get) editing environment.

SUMMARY OF THE INVENTION

According to the present invention, a Web page creator need use only an input device to specify a text portion for which audible reading is desired, so that tag information and a program that are required when a browser reads a specific portion of text are automatically inserted into a Web page that is being created. In this manner, a Web page in which text is to be audibly read can be easily created.

Further, according to the present invention, to visually display an area to be read audibly, a tag, such as a tag for marking the area that is to be read, is automatically inserted, thereby enabling both the creator and the reader of a Web page to easily identify which portion is to be read.

It is, therefore, one object of the present invention to provide a method and an apparatus whereby a desired text area for the audible reading of a portion of a Web page can be easily specified and created by using only an input device, such as a keyboard or a mouse.

It is another object of the present invention to provide a method and an apparatus whereby the form of the display used for an area, as specified by a Web page creator, that is to be read audibly differs from the forms used for other areas, so that the area that is to be read audibly can be quickly identified.

These and other objects, features and advantages of the invention will be apparent to those skilled in the art in view of the following detailed description and accompanying drawings.

BRIEF DESCRIPTION OF THE DRAWINGS

FIG. 6 is a diagram showing an example source file for a Web page for which a reading area is specified.

FIG. 9 is a diagram showing an example source file for a Web page for which an audible reading area can be visually displayed.

DESCRIPTION OF THE PREFERRED EMBODIMENT

Example Hardware

Figure 1:
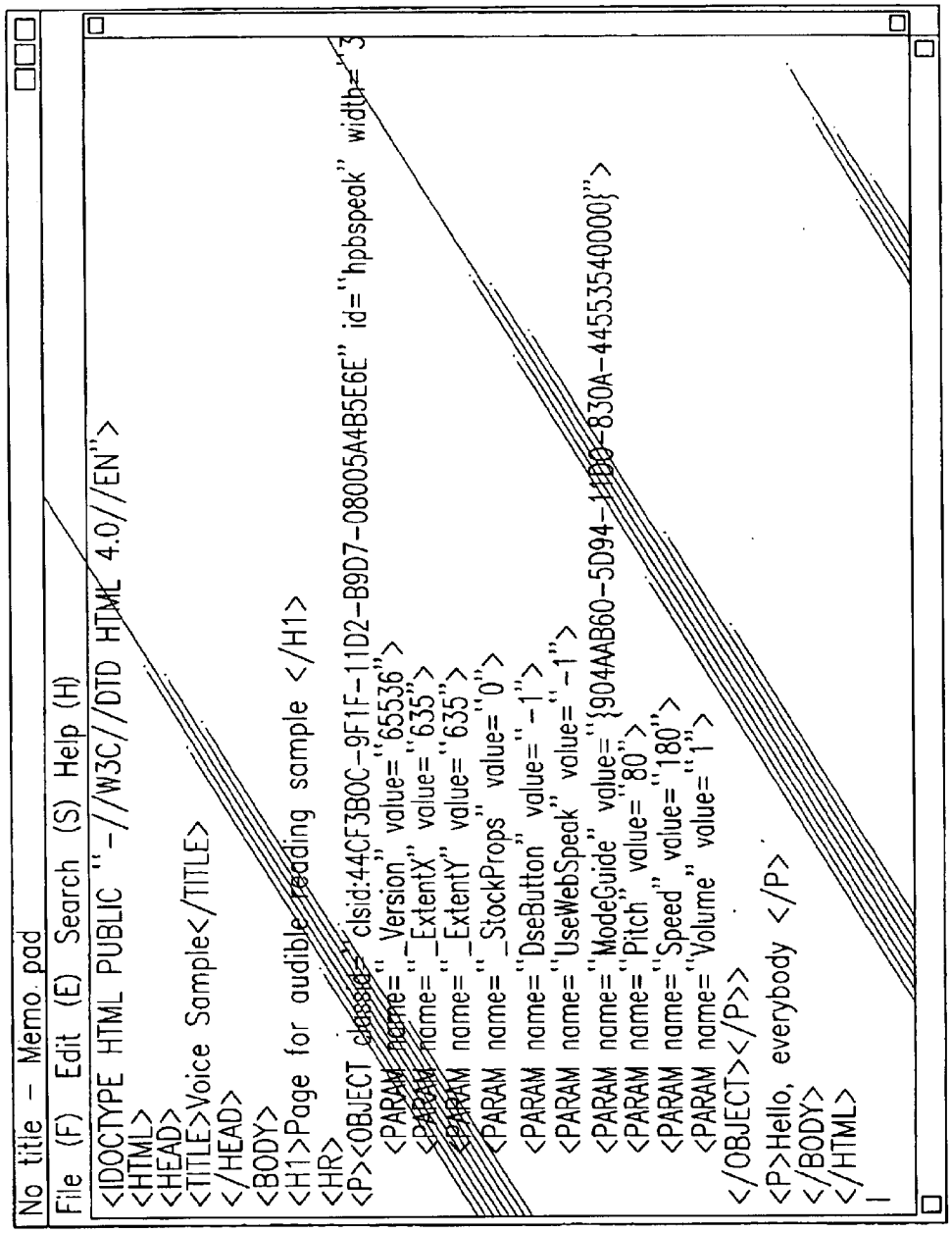
FIG. 1 is a diagram showing an editing screen for a conventional text editor.
Figure 2:
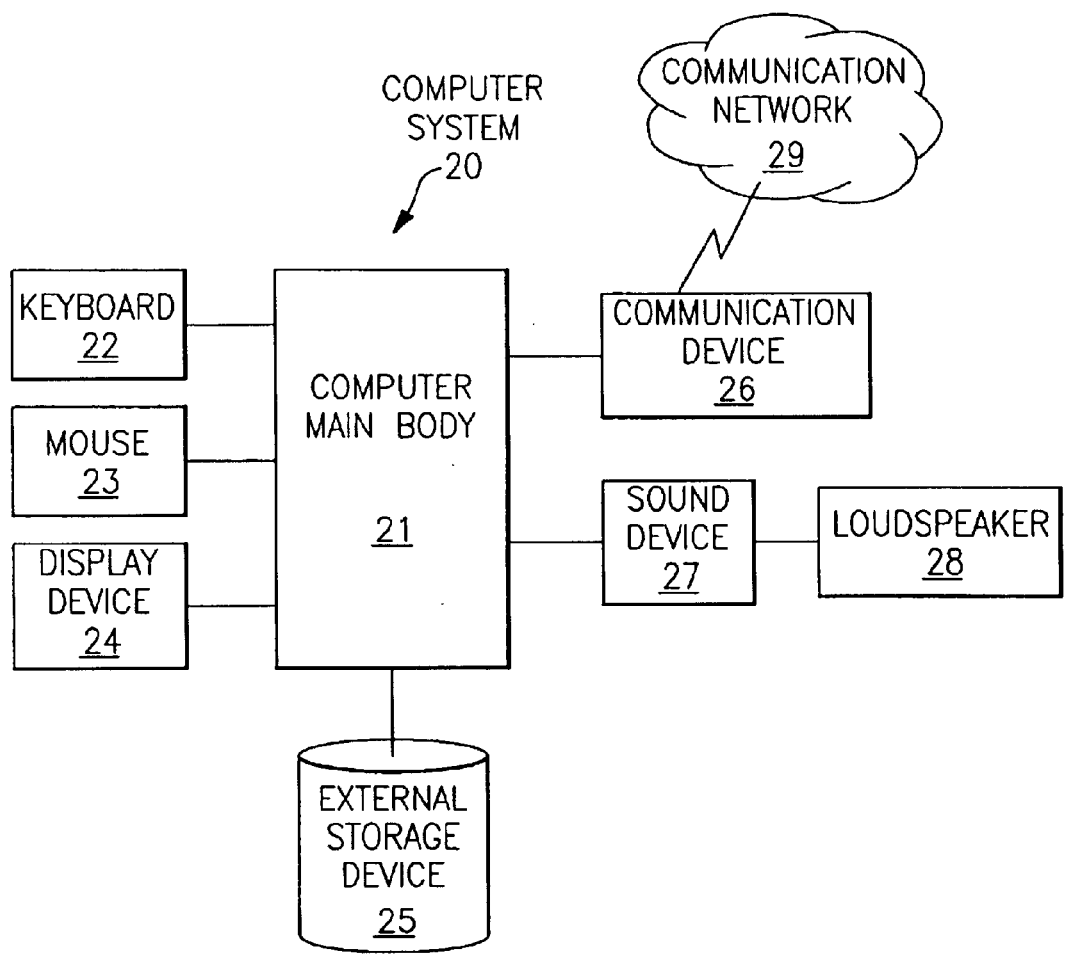
FIG. 2 is a diagram showing the hardware arrangement for the present invention.

FIG. 2 is a diagram showing the hardware arrangement of the present invention, used for a computer that is connected to the Internet. A computer system 20 comprises: a computer main body 21, including a CPU, a memory, and various controllers; input devices, such as a keyboard 22 and a mouse 23; a display device 24; and an external storage device 25, such as a hard disk. The keyboard 22 or the mouse 23 is employed by a Web page creator to enter instructions for an application program. An operating system (OS) and an authoring tool, which is an application program, are stored in the external storage device 25, and are loaded into the memory for execution. Document data (for a Web page) processed by the application program are loaded from the external storage device 25 to the memory. A communication device 26, such as a modem or a terminal adapter, is connected to the computer main body 21 to transmit a Web page to the Internet. After the Web page has been transmitted across a communication network 29 to a server, other users can refer to it. The communication network 29 can be an ISDN network, a dedicated data network, or a public network along which the transmission of data is enabled. The hardware arrangement of the present invention also includes a sound device 27 and a loudspeaker 28.

Example Software

The present invention can effectively employ a document creation application program, such as the authoring tool used for creating a Web page. The authoring tool is an application program for reading a new document or a document file stored in an external storage device, and for enabling an input device, such as a keyboard or a mouse, to perform editing, represented by the entry or the deletion of characters and images. The results obtained by editing a Web page are displayed on the display device 24, and when the editing process has been completed, the results are stored in the external storage device 25.

Figure 3:
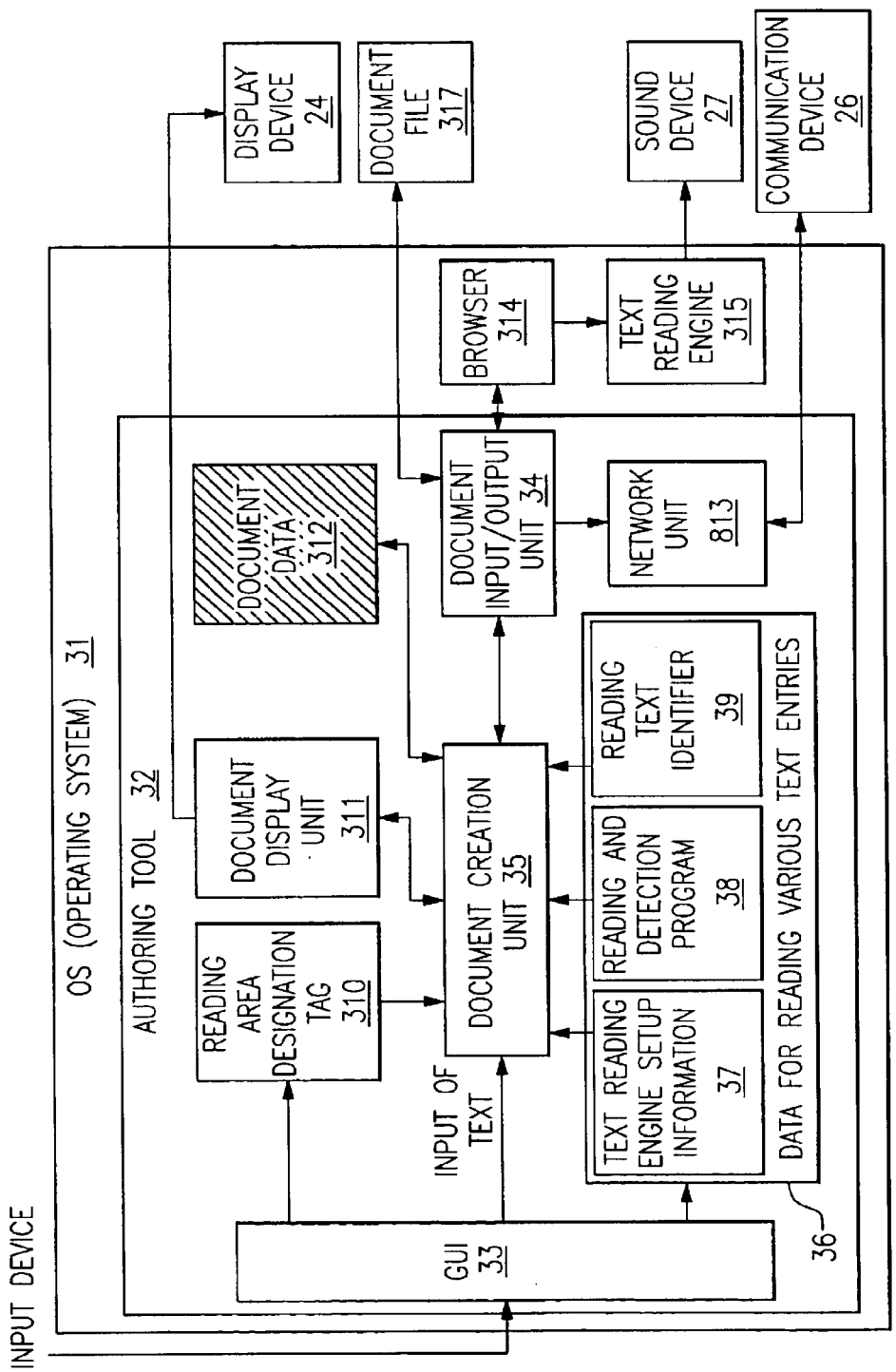
FIG. 3 is a diagram showing the software arrangement for the present invention.

FIG. 3 is a diagram showing the software functional units according to the present invention. An authoring tool 32 includes: a GUI 33 for editing a document; a document input/output unit 34 for reading a document form, or for storing a document in an external storage device in accordance with a command received via the GUI 33; a document creation unit 35, for preparing currently edited document data 312 in accordance with a command received via the GUI 33; and a document display unit 311, for displaying the document data that have currently been prepared.

The authoring tool 32 separately stores a variety of text reading data 36 that must be inserted into a document in order for text to be read audibly. The authoring tool 32 has a preview function for activating a browser 314 in order to display and verify the contents of a document that has been created. A text reading engine 315 must also be introduced into the OS 31, so that a page created by the authoring tool 32 can be read using the browser 314. The browser 314 transmits to the text reading engine 315\ target text based on the included Web page information, and the text reading engine 315 controls the sound device 27 for the generation of a voice. Further, the authoring tool 32 includes a network unit 313 for transmitting the Web page that has been created to the host server via the network.

Web Page Audible Read Segment Creation

The processing for the creation of a Web page for which only a desired area is to be read audibly, and the processing performed by the authoring tool 32 will now be explained while referring to FIG. 4.

First, at step 41, the authoring tool 32 is activated, and at step 42, a new document, which is the text portion of a Web page, either is created, or a document file 317 is read from the external storage device. At step 43, an input device, such as a keyboard or a mouse, is employed to specify an area, in the document created at step 42, that is to be read audibly. In the same manner as an input device is used to mark a desired copy area in word processor text, the input device is employed to specify, in a text portion, an area that it is desired be read audibly. At step 44, a menu item for specifying audible text reading is selected from the operating menu for the authoring tool 32 and is executed. At step 45, a check is performed to determine whether an environment has been prepared for the audible reading. In this embodiment of the invention, the state wherein the audible reading environment is prepared is the state wherein text reading engine setup information and a text reading detection program are inserted into a document. When, at step 45, the audible reading environment has not yet been prepared, program control moves to step 451. Text reading engine setup information 37 is inserted into the document, so that the text reading engine 315 can be employed when the browser 314 reads the document. (The text reading engine setup information 37 will be described later while referring to FIG. 6.) At step 452, text is determined for which the reading of a document by a browser is designated, and a reading text detection program 38, which can transmit the text in a specified area to the text reading engine 315, is inserted into the document. This program detects a reading area designation tag in the document, and transmits the text portion marked by the reading area designation tag to the text reading engine 315. The processes at steps 451 and 452 may be reversed.

Since program control advances from step 45 to step 48 for a Web page for which the audible reading environment has been previously prepared, reading area designation tags 310 are simply inserted before and after the audible reading area designated at step 43.

At step 49, a reading text identifier 39 is set as an attribute for the reading area designation tags 310. This identifier is used to identify the reading text detection program 38 that can detect a text portion marked by the reading area designation tags 310. (The reading text detection program 38 will be explained later while referring to FIG. 6.)

Reading Text Detection Program

Figure 5:
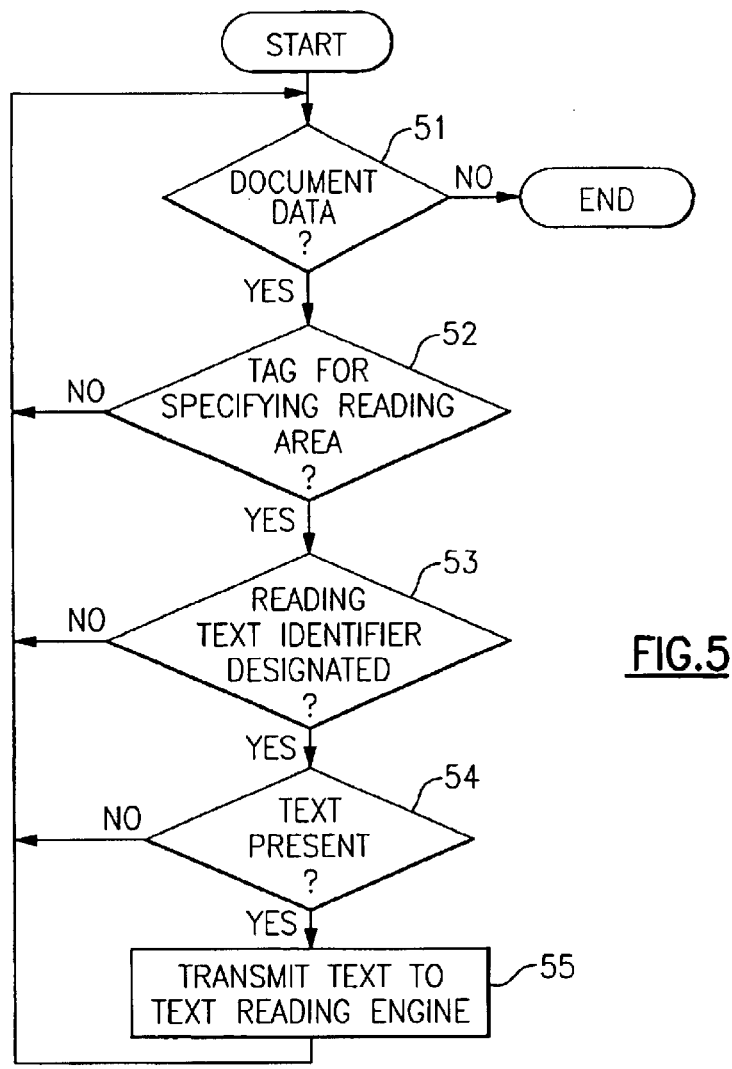
FIG. 5 is a flowchart showing the processing performed by a reading text detection program.

The processing for the reading text detection program 38 will now be described while referring to FIG. 5. First, at step 51, a check is performed to determine whether any document data remains. If the current document data is the last, the processing is terminated. If there is document data remaining, at step 52, a check is performed to determine whether the tag is a reading area designation tag. If, at step 52, it is ascertained that the tag is a reading area designation tag, at step 53, a check is performed to determine whether the reading text identifier 39, which is used to identify the reading text detection program 38 that can detect text marked by the reading area designation tag, is set as the attribute. If the reading text identifier 39 is set as the attribute, at step 54, a check is performed to determine whether text is present between the reading area designation tags for which the reading text identifier is set as the attribute.

When, at step 54, it is ascertained that text is present within the area marked by the reading area designation tags for which the reading text identifier 39 is set as the attribute, program control advances to step 55. The text marked by the reading area designation tags is transmitted to the reading text detection program 38 that is designated by the reading text identifier 39.

The source file, for a Web page in which an area in which text is to be read audibly is specified, will now be described while referring to FIG. 6. A reading text detection program 61 in FIG. 6 is an example of the program 38.
"<SCRIPT LANGUAGE="JavaScript">"
Declares JavaScript is to be used for the program.
"function windows_Onload( )"
Declares the reading text detection program 38. In accordance with "<BODY onLoad=windows_Onload( )>", which is separately declared in another document, this program is referred to and can be called when a page is read by a browser.

"for (i=0; i<document.all.length; i++)"

Determine whether the end of the document has been reached. If the available data does not constitute the end of the document, program control goes to the next step. If the data so constitutes the end of the document, this program is terminated.

"if(document.all(i).tagName=="SPAN"document.all(i).tagName=="DIV")"

Examines tags used in a document to determine whether there are tags 310 marking off an area that is to be read audibly ("SPAN" or "DIV" in this invention). Tags for specifying an area to be read audibly can be changed by design. When a reading area designation tag is found, the next process is performed. When a reading area designation tag is not found, the next tag in the document is examined.

"if (document.all(i).className=="hpb_speak")"

A check is performed to determine whether a reading text identifier 39 ("hpb_speak") has been designated as an attribute for the reading area designation tag 310. If this identifier has been so designated, program control goes to the next step. If this identifier has not been so designated, the next tag in the document is examined.

"if(document.all(i).innerText!=0)hpb_speak.Speak(document.all(i).innerText);"

Finally, a check is performed to determine whether text is present in an area sandwiched between the reading area designation tags 310 for which the reading text identifier 39 is set as the attribute. If text is present, the text is transmitted to the reading text detection program 38 that is designated by the reading text identifier 39. That is, the text to be read is designated an argument for a function (Speak) used by the text reading engine when audibly reading text, and this function is executed. After this function is executed, the next portion is examined for text to be read audibly.

Reading area designation tags 63 are shown in FIG. 6. In the first example for the text reading portion 63 in FIG. 6, "<DIV CLASS="hpb_speak">
<H2>Release of new notebook computer decided</H2>
. . .
</DIV>"

are designated, so that the portion "Release of new notebook computer decided" can be specified for audible reading.

In the second example for the text reading portion,

"<SPAN CLASS="hpb_speak">Plan to release new notebook computer in January 2000</SPAN>"

is designated, so that the portion "Plan to release new notebook computer in January 2000" can be specified for audible reading.

The reading text identifier "hpb_speak" is set as the attribute for the reading area designation tags "DIV" and "SPAN." The text portion specified by the reading area designation tags "DIV" and "SPAN" is transmitted to the reading text detection program 38 specified by the reading text identifier "hpb speak." The reading text detection program 38 transmits, to the text reading engine 315, the text sandwiched between the reading area designation tags, and the text reading engine 315 begins the reading process.

Figure 4:
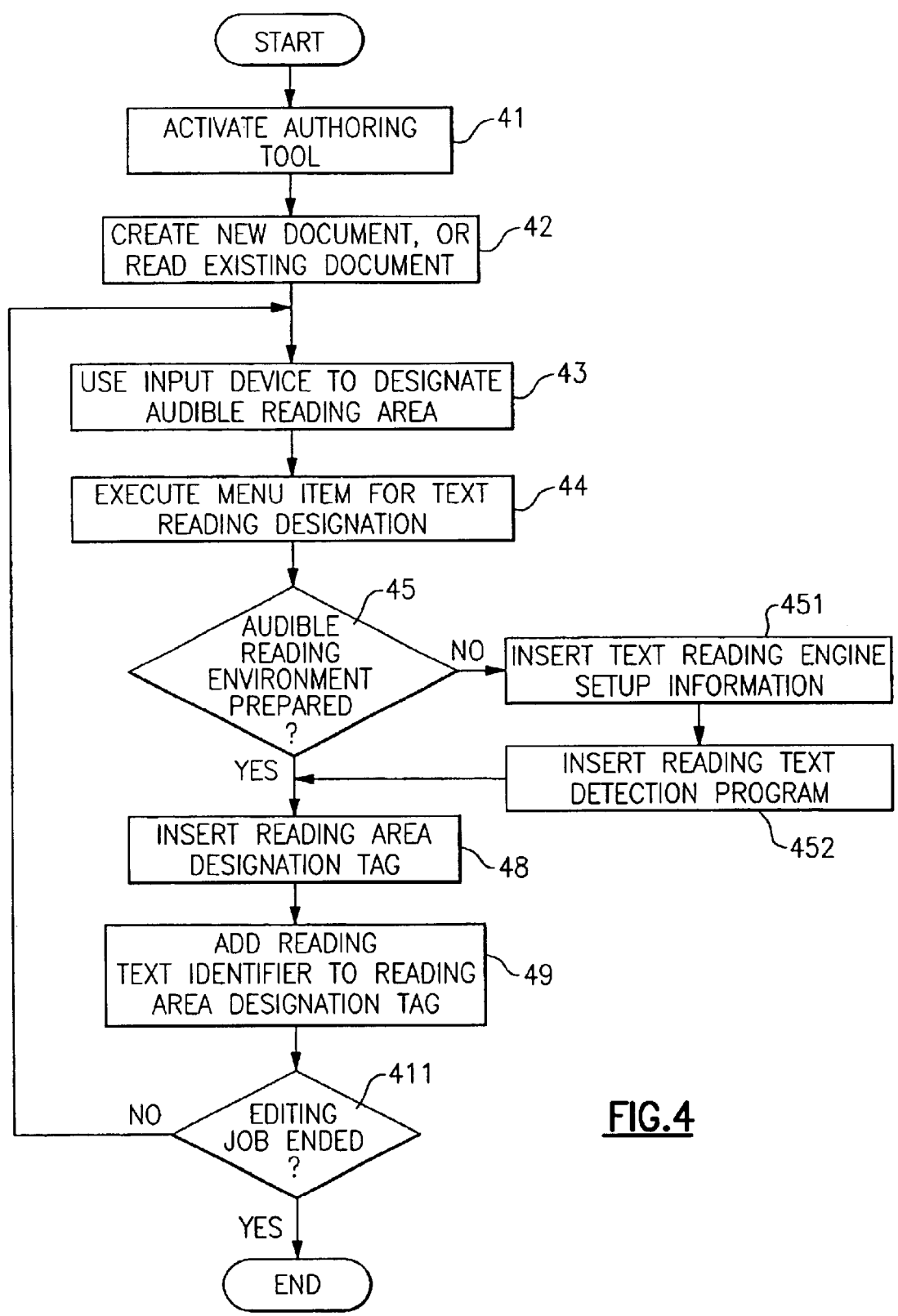
FIG. 4 is a flowchart showing the processing for creating a page for audible reading.

Once the text reading engine setup information 37 and the reading text detection program 38 have been inserted into the document in a Web page, steps 451 and 452 in FIG. 4 are not required when another portion in the document is specified for reading.

Marking Text in Advance

As another method, instead of specifying an area in an existing document, tag information for designating a reading area may be inserted in advance, and text may be entered as part of the tag information.

A tag indicated by the text reading engine setup information 62 in FIG. 6 will now be explained. When reading text identifier "hpb_speak," designated in OBJECT id="hpb_speak," is referred to, the text detected by the reading text detection program 38 can be transmitted to the text reading engine 315, which can then read the text portion that is designated an area to be read audibly.

Specifically, in FIG. 6 the reading text detection program 61, the text reading engine setup information 62 and the specified portions 63 that are to be read audibly are correlated with each other by the reading text identifier "hbp_speak," which is the attribute for the reading area designation tags. Therefore, the reading area marked by the reading area designation tags can be transmitted to the reading text detection program. Further, the reading text detection program transmits this area to the text reading engine, so that the reading of a desired portion can be performed audibly.

The following parameters can be designated for the text reading engine setup information 62 in FIG. 6.

"<PARAM name=xyz>"

The attribute specified by "name-xyz" in <PARAM> is an attribute for the text reading engine, and is used to designate parameters for displaying, or not displaying, a button to control reading, and for setting the reading speed and the volume.

Previewing

Figure 7:
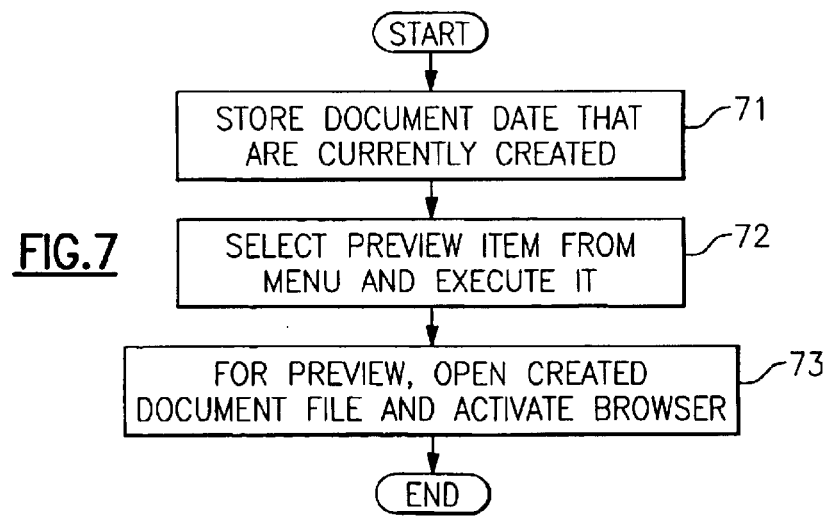
FIG. 7 is a flowchart showing the preview processing performed by the browser.

FIG. 7 is a flowchart showing the processing for employing, for a Web page that has been created, a preview function that provides for text to be read audibly to determine whether a reading area has been correctly designated.

First, at step 71, the document that has been created is stored, and at step 72, a preview function, for which a browser is used, is selected from the operating menu for the authoring tool and is executed. At step 73, the created document is designated an argument and is displayed by the browser. The created document is read and displayed by the browser via the document input/output unit 34. In accordance with the contents of the document, the browser transmits designated text to the text reading engine. The text reading engine employs the sound device to audibly read the received text, so that a user can confirm that a reading area has been correctly designated.

Marking and Displaying Audible Text Alternate Embodiment

A second embodiment will now be described which additionally includes a function for marking and displaying an area specified for audible reading, so that the area can be easily identified by a Web page creator using the authoring tool and a Web page reader using a browser.

Figure 8:
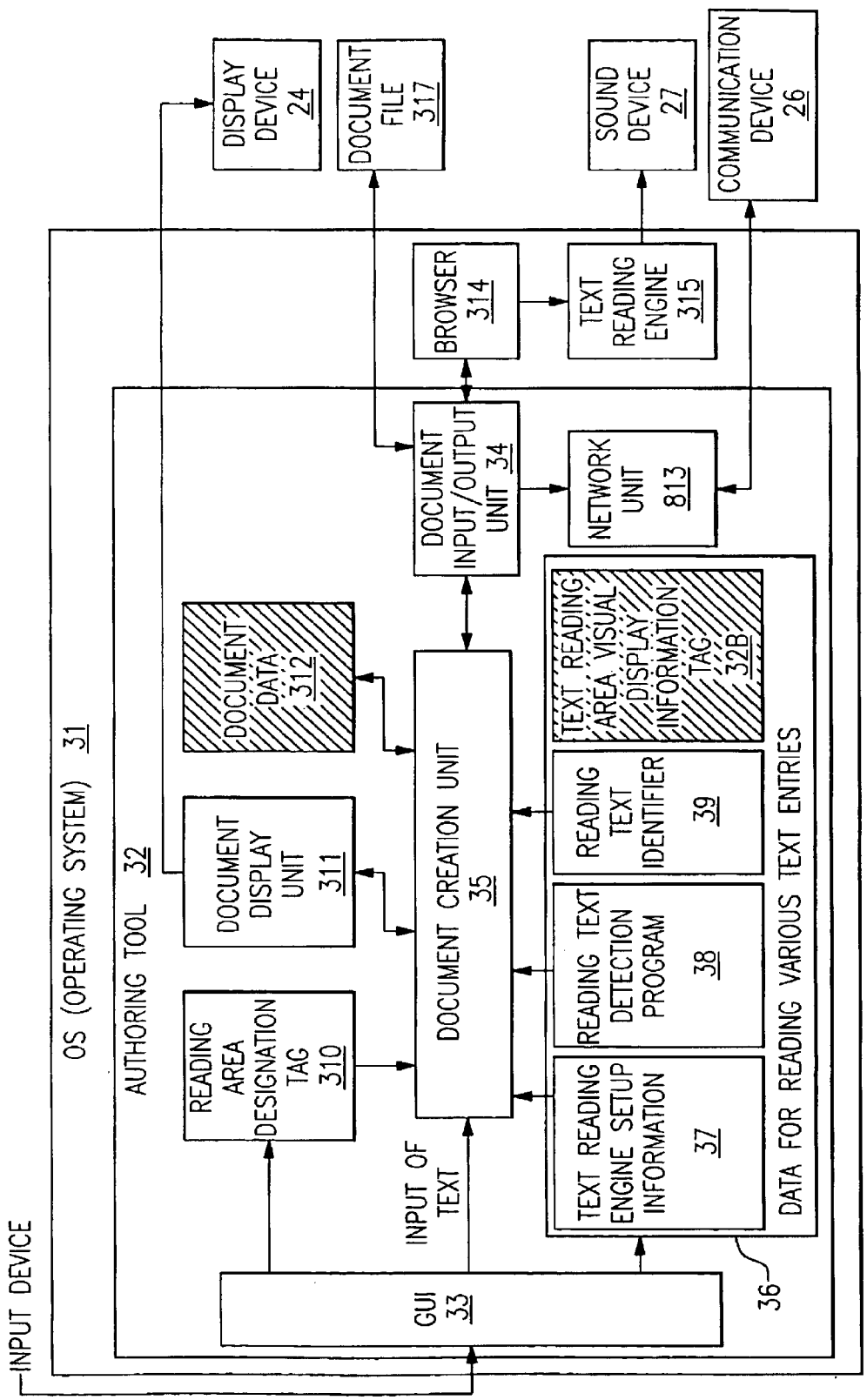
FIG. 8 is a diagram showing the software arrangement when a reading area is visually displayed.

In the second embodiment, as is shown in FIG. 8, an information tag 320, for visually displaying a text reading area, is added to the software arrangement in FIG. 3 as one type of text reading data 36. Information for visually expressing a portion specified for audible reading is designated as the information tag 320. Any method known in the art can be used, for example, a background color, or the size or the color of characters in the area specified for audible reading can be changed, or shading can be used to set off the area.

The information tag 320, for visually displaying a text reading area, is defined by using the same name as the reading text identifier 39 in the first embodiment. Then, when an area for audible reading is specified by using the reading area designation tags for which the reading text identifier 39 is set as the attribute, the reading area can be automatically displayed in the form that is set using the information tag 320 to visually display the text reading area.

FIG. 9 is a diagram showing an example 91 for the text reading area visual display information tag 320. In this example, the foreground in the designated area is displayed in red, and the background is displayed in yellow.

In the text reading area visual display information tag 91, "<STYLE>,"
using the <STYLE> tag, style information is set in the document.
".hpb_speak{ . . . }"
The style is defined in accordance with a class. In this example, the style having the same class name as the reading text identifier 39 "hpb_speak" is defined.
"backgroundcolor: yellow;"
With this setting, for the display of the area specified for audible reading, the background color is yellow.
"color: red;"
With this setting, for the display of the area specified for audible reading, the foreground color is red. The above color settings are merely examples, and can be changed.

Figure 10:
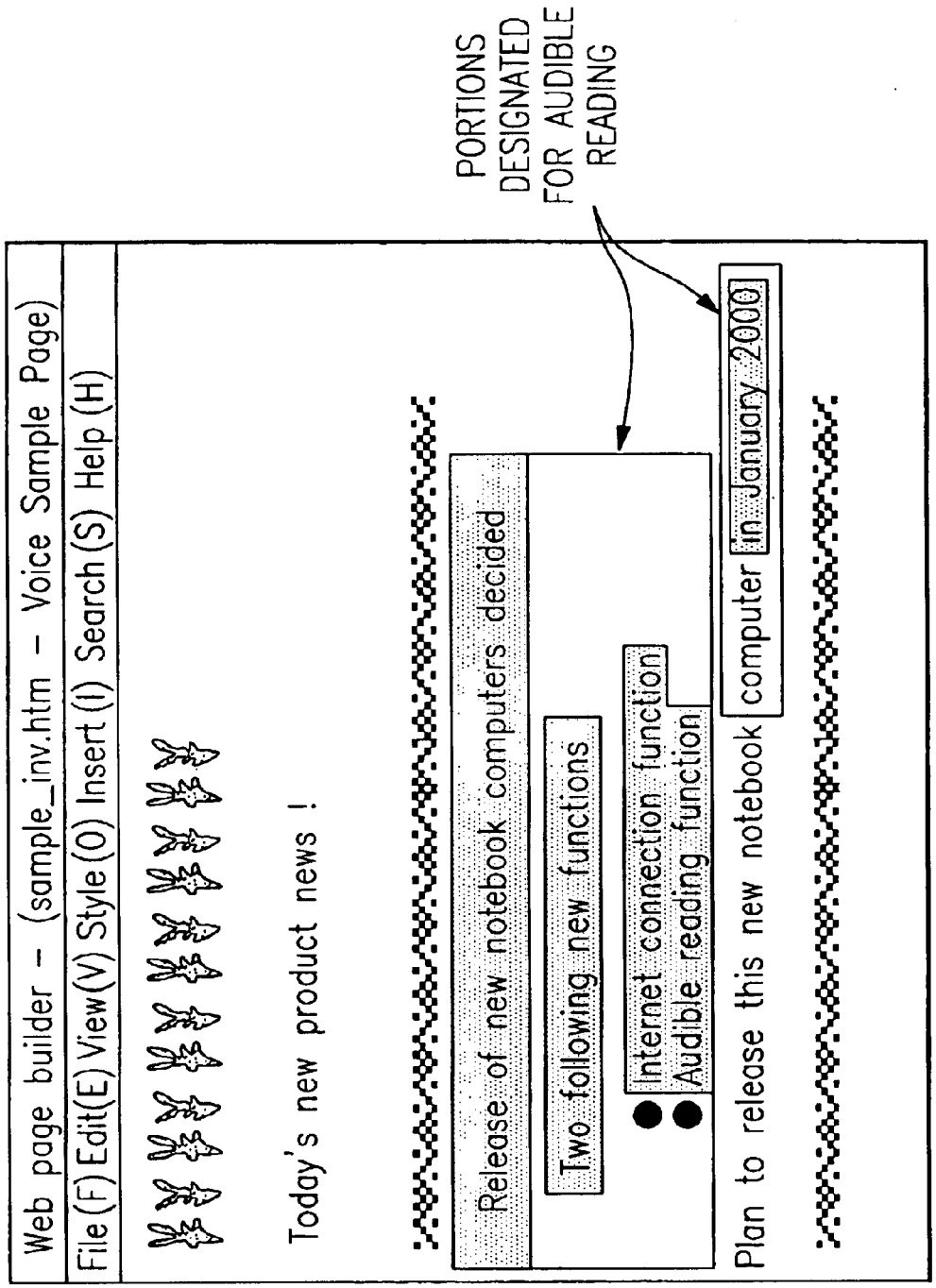
FIG. 10 is a diagram showing an editing screen provided by an authoring tool.

FIG. 10 is a diagram showing an example screen display when this document is edited by the authoring tool. In FIG. 10, a marked area is designated as an audible reading area by a Web page creator. Usability of the Web page is considerably enhanced by changing the appearance of the area that is specified for audible reading, since the user can identify at a glance the area specified for audible reading.

Figure 11:
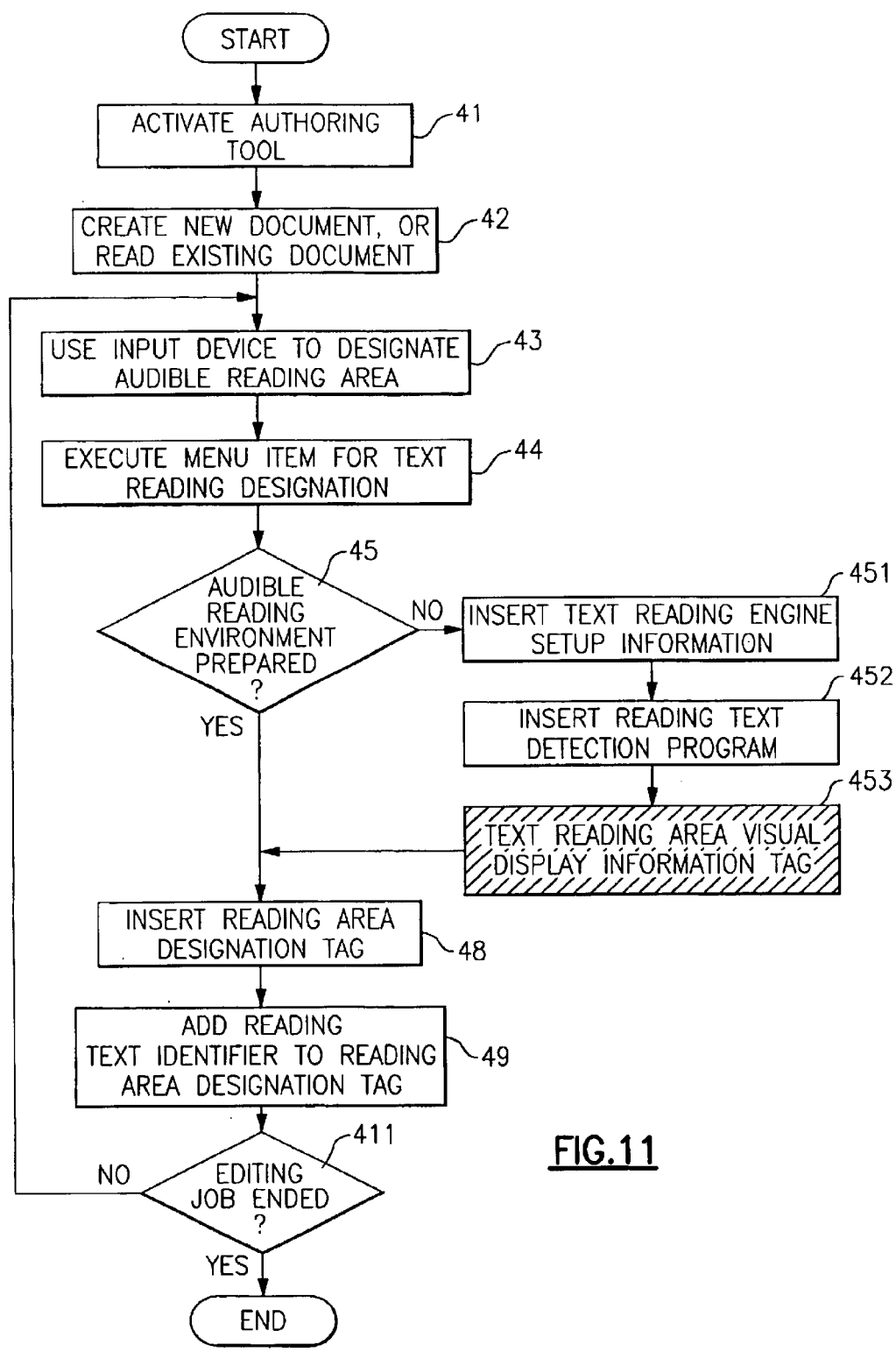
FIG. 11 is a flowchart showing the processing performed using an additional function for visually displaying an area for audible reading.

The text reading area visual display information tag 320 can be implemented by adding step 453 to the processing (FIG. 4) for the first embodiment, as is shown in FIG. 11.

Alternative Implementations

The present invention has been explained by employing the above embodiments; however, it can be easily understood by one having ordinary skill in the art that modifications can be made without departing from the subject and the scope of the present invention.

For example, instead of using an input device, such as a mouse or a keyboard, a touch panel on a display screen can be used to designate an area for audible reading.

In addition, a designated area can be read audibly not only when the Web page is displayed by the browser, but also in response to the clicking of the mouse in that portion.

Furthermore, the audible reading of a specified area can be performed in response to the mouse being present in that area for a predetermined period of time or longer, or the audible reading of the specified area can be performed when a predetermined time has elapsed since the page in which the pertinent area is included was displayed.

Further, substitute text that is designated a caption for an image on a Web page can be audibly read. The image on a Web page can not be audibly read, but the caption of the image can be designated as an HTML ALT attribute for the HTML tag that is used to mark the image. Therefore, the reading text detection program 38 is changed so that the image is detected for which the ALT attribute is set and so that the caption for the pertinent image is obtained, which enables the implementation of the page wherein the caption of the image is audibly read.

According to the present invention, even a Web page creator who has no knowledge of HTML can easily use an input device, such as a keyboard or a mouse, to specify a Web page text area for which audible reading is desired. In this fashion, a desired portion in the Web page can be created that can be read audibly.

Further, according to the present invention, an audible reading area specified by a Web page creator can be set off and displayed so that it can be distinguished from other areas in the Web page. Thus, a system can be provided by which a user can identify at a glance an area designated for audible reading, and with which an audible reading area can be easily changed.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A method for creating an Internet Web page having an area for text audible reading, the method comprising the steps of:
   loading a web page document into a web page authoring tool editing program, the web page document for defining a web page displayable by way of a browser program;
   displaying the web page defined by said loaded web page document;
   selecting a readable text area of said displayed web page using a user input device, the readable text area selected for audible reading;
   based on said selecting step, generating with the web page authoring tool editing program, text audible reading attributes of said selected readable text area for use by a text audible reading engine;
   augmenting said web page document with said text audible reading attributes; and
   saving said augmented web page document to a web page server.

2. The method according to claim 1 wherein the text audible reading attributes include a reading area designation tag.

3. The method according to claim 1 wherein the text audible reading attributes include setup information for a text audible reading engine.

4. The method according to claim 1 wherein the text audible reading attributes include a text audible reading detection program.

5. The method according to claim 1 wherein the text audible reading attributes include a text audible reading identifier for identifying said text audible reading detection program.

6. The method according to claim 5 wherein the text audible reading attributes include an information tag for the visual display of a text audible reading area having the same class name as said text audible reading identifier.

7. The method according to claim 1 further including the additional step of previewing by audibly reading the desired area.

8. The method according to claim 1 further including the additional step of specifying an alternate text for audible reading, the alternate text associated with the desired area.

9. An apparatus for creating an Internet Web page having an area for text audible reading, the apparatus comprising:
   an loader loading a web page document into a web page authoring tool editing program, the web page document for defining a web page displayable by way of a browser program;

a display displaying the web page defined by said loaded web page document;

a user input device selecting a readable text area of said displayed web page, the readable text area selected for audible reading;

a generator based on said selecting step, generating with the web page authoring tool editing program, text audible reading attributes of said selected readable text area for use by a text audible reading engine;

an augmenter augmenting said web page document with said text audible reading attributes; and a saver saving said augmented web page document to a web page server.

10. The apparatus according to claim 9 wherein the text audible reading attributes include a reading area designation tag.

11. The apparatus according to claim 9 wherein the text audible reading attributes include setup information for a text audible reading engine.

12. The apparatus according to claim 9 wherein the text audible reading attributes include a text reading detection program.

13. The apparatus according to claim 9 wherein the text audible reading attributes include a text reading identifier for identifying said text reading detection program.

14. The apparatus according to claim 13 wherein the text audible reading attributes include an information tag for the visual display of a text reading area having the same class name as said text reading identifier.

15. The apparatus according to claim 9 further including a previewer previewing by audibly reading the desired area.

16. The apparatus according to claim 9 further including a specifier specifying an alternate text for audible reading associated with the desired area.

17. A computer program product comprising a computer useable medium having computer readable program code means therein for creating an Internet Web page having an area for text audible reading, the computer program code means in said computer program product comprising:

computer readable program code for loading a web page document into a web page authoring tool editing program, the web page document for defining a web page displayable by way of a browser program;

computer readable program code for displaying the web page defined by said loaded web page document;

computer readable program code for selecting a readable text area of said displayed web page using a user input device, the readable text area selected for audible reading;

computer readable program code for generating with the web page authoring tool editing program text audible reading attributes of said selected readable text area for use by a text audible reading engine, said generating based on said selecting step;

computer readable program code for augmenting said web page document with said text audible reading attributes; and computer readable program code for saving said augmented web page document to a web page server.

18. The program product according to claim 17 wherein the text audible reading attributes include a reading area designation tag.

19. The program product according to claim 17 wherein the text audible reading attributes include setup information for a text audible reading engine.

20. The program product according to claim 17 wherein the text audible reading attributes include a text reading detection program.

21. The program product according to claim 20 wherein the text audible reading attributes include a text reading identifier for identifying said text reading detection program.

22. The program product according to claim 17 further including computer readable program code for previewing by audibly reading the desired area.

23. The program product according to claim 17 further including the computer readable program code for specifying an alternate text for audible reading associated with the desired area.

* * * * *